Patented June 14, 1932

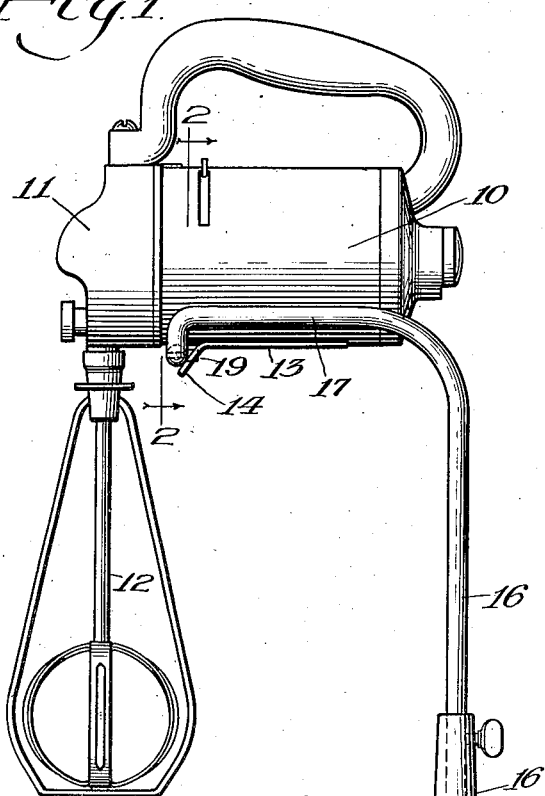
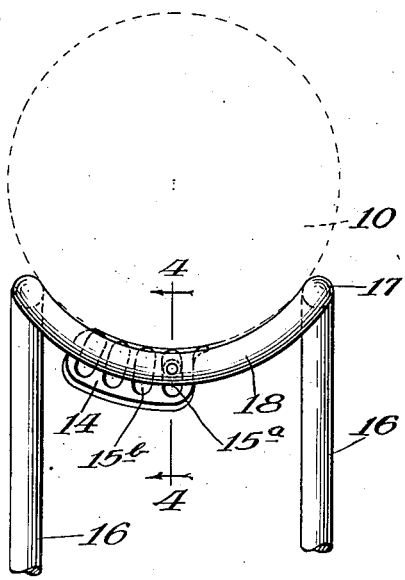
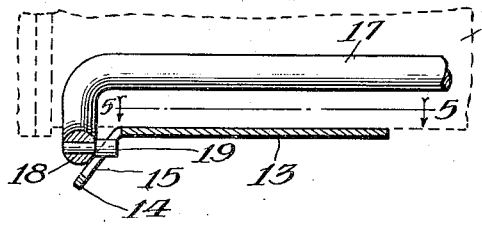
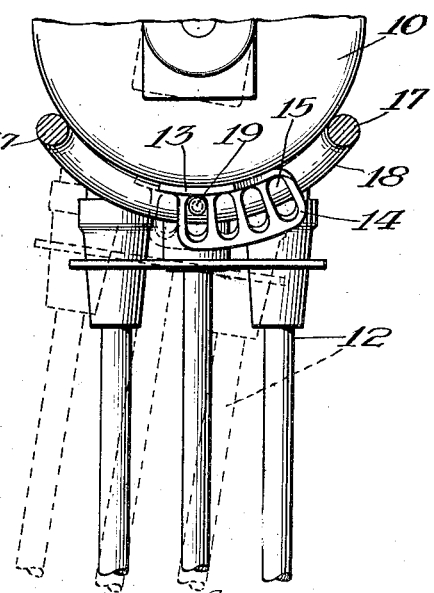
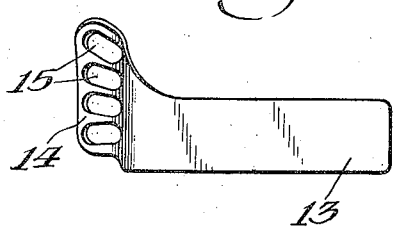

1,862,826

UNITED STATES PATENT OFFICE

EDWARD R. MROSS, OF RACINE, WISCONSIN, ASSIGNOR TO HAMILTON BEACH MANUFACTURING COMPANY, OF RACINE, WISCONSIN, A CORPORATION

ADJUSTABLE SUPPORT FOR FOOD MIXERS

Application filed November 3, 1930. Serial No. 492,885.

This invention relates to supports for food mixers and more particularly to a support by means of which a motor driven mixer may be supported in adjusted position.

The object of the invention is to provide means for quickly and easily positioning a motor driven mixer on a support and for retaining the mixer in any one of a number of positions.

It has been found in using motor driven mixers supported in fixed position relatively to a container, that the ingredients in the center of the container are mixed more thoroughly than the ingredients which are removed from the center. To accomplish thorough mixing it is desirable to tilt the mixer to one side in order to move the beater elements to one side of the center of the container. By revolving the bowl while holding the mixer in tilted position, all the ingredients are operated upon by the mixer. The main object of the present invention is to provide convenient and efficient means for adjusting and retaining the mixer on a support in one of a plurality of positions for the purposes set forth.

The construction also embodies means for preventing forward movement of the motor on the support.

In the drawing:

Fig. 1 is a side elevation of a food mixer and support embodying my invention.

Fig. 2 is an enlarged transverse vertical section taken on the line 2—2 of Fig. 1, looking toward the front of the support, the motor being indicated in dotted lines.

Fig. 3 is a rear elevation of the mixer and support, showing in full and in dotted lines, different positions of the mixer on the support.

Fig. 4 is a longitudinal vertical sectional view taken on the line 4—4 of Fig. 2.

Fig. 5 is a plan view of that part of the adjusting means which is attached to the motor of the mixer for cooperating with the support to hold the mixer in adjusted position.

In that embodiment of the invention shown in the drawing, the motor driven food mixer comprises a horizontally disposed motor 10, having fixed to one end a gear casing 11 in which is mounted the depending agitator unit 12.

On the under side of the motor casing 10, at one side of the longitudinal median line of the motor, is welded or otherwise suitably secured a plate 13 which is complemental to the form of the motor casing 10. On the forward end of the plate 13 is a downwardly and forwardly inclined flange 14. The flange 14 is provided with a plurality of vertically elongated slots 15, in this instance four, for a purpose to be described.

The food mixer support preferably comprises a pair of spaced apart, parallel upright rods 16 mounted at their lower ends in sockets 16' on a suitable base (not fully shown). The rods 16 may be raised or lowered in the sockets 16' and held in adjusted position by a set screw. This adjustment permits the beater unit 12 to be in proper position relatively to the mixing bowl. At their upper ends the rods 16 are curved and form forwardly extending, spaced apart, parallel, horizontally disposed arms 17 joined together at their forward ends by a cross rod 18 concave on its upper surface. The rod 18 conforms to the transverse curve of the lower part of the motor 10 and the arms 17 are sufficiently close together and long enough to form a bed for the motor to rest upon.

A rearwardly projecting pin 19 is rigidly secured to the cross rod 18 midway between the arms 17 and is adapted to enter one of the slots 15 when the motor is in position on the support.

The mixer may be positioned on the support by lowering the motor to the arms 17 with the flange 14 located somewhat rearwardly of the cross rod 18 and pin 19. Then the motor is moved forwardly until the flange touches the rod 18, as shown in Fig. 1, and the pin 19 enters one of the slots 15. If the mixer is in its normal position, with the agitator unit 12 upright, the pin 19 will enter the first slot 15 which is indicated at 15a in Fig. 2. If it is desired to tilt the mixer slightly so as to bring the beater elements into contact with the ingredients toward the sides of the bowl as it is being revolved by the operator, the motor may be turned slightly about its own axis so that the pin 19 will enter one of the other slots, for example, the slot indicated at 15b in Fig. 2; in which position the mixer and its agitator unit will appear as indicated in dotted lines in the rear view shown in Fig. 3.

Any number of slots in the flange 14 may be provided to permit the mixer to be tilted to a desired degree and to be held in a variety of adjusted positions. The engagement of parts 14 and 19 also overcomes the natural tendency of the mixer to move forwardly on the support.

It is to be understood that the exact form of cooperating means on the support and on the mixer as herein shown, need not be adhered to. Obviously a slotted rack could be secured to the cross bar 18 of the support and a pin similar to the pin 19 could be secured to the motor or other part of the mixer. Again the position of the plate 13 might be altered so as to bring the flange 14 somewhat forwardly of its present position and the pin 19 on the cross bar 18 might be forwardly directed for engaging the slotted flange. Another obvious modification would be to have a downwardly projecting pin on the motor or other part of the mixer for entering one of a plurality of recesses in the cross bar 18; or the pin might project upwardly from the cross bar 18 and the recesses might be drilled in the motor or other part of the mixer. All of these modified constructions would function to hold the motor in adjusted tilted position and also to prevent movement longitudinally of the motor, in one or two directions.

Other changes may be made in details of construction without departing from the scope of my invention and I do not intend to be limited to the exact form shown and described except as set forth in the appended claims.

I claim as my invention—

1. A support for a motor driven food mixer comprising a base, a pair of upright members mounted on the base, horizontally disposed arms extending forwardly from said upright members, a cross rod connecting the forward ends of said arms, and cooperating means on the motor and on the support for retaining the mixer in adjusted position on the support, said cooperating means comprising a pin on the cross rod and a slotted flange on the motor.

2. A support for a motor driven food mixer comprising a base, a pair of upright members mounted on the base, horizontally disposed arms extending forwardly from said upright members, a cross rod connecting the forward ends of said arms, and cooperating means on the motor and on the support for retaining the mixer in adjusted position on the support, said cooperating means comprising a rearwardly directed pin on the cross rod of the support and a flanged plate having a plurality of slots in the flange, fixed to the motor.

3. A motor driven food mixer support comprising a base provided with a pair of cylindrical sockets rising from the base, and a motor rest consisting of a rod bent between its ends to form spaced apart parallel upright members, parallel horizontally disposed arms extending forwardly from the upper ends of the upright members and a cross rod integral with and connecting the forward ends of the horizontally disposed arms, the lower ends of the upright members being mounted in the base sockets, the motor being revoluble about its own axis while supported on the motor rest, and means on the motor and on the cross rod of the rest for holding the mixer in adjusted position on the motor rest.

4. A motor driven food mixer support comprising a base provided with a pair of cylindrical sockets rising from the base, and a motor rest consisting of a rod bent between its ends to form spaced apart parallel upright members, parallel horizontally disposed arms extending forwardly from the upper ends of the upright members and a cross rod integral with and connecting the forward ends of the horizontally disposed arms, the lower ends of the upright members being mounted in the base sockets, the motor being revoluble about its own axis while supported on the motor rest, and means on the motor and on the cross rod of the rest for holding the mixer in adjusted position on the motor rest, said means comprising a pin on the motor rest cross rod and a slotted flange on the motor.

In testimony that I claim the foregoing as my invention, I affix my signature this 28 day of October, 1930.

EDWARD R. MROSS.